Patented Apr. 17, 1945

2,374,051

UNITED STATES PATENT OFFICE 2,374,051

MANUFACTURE OF ACRYLONITRILE FROM ETHYLENE CYANOHYDRIN

Le Roy U. Spence, Elkins Park, Pa., assignor to Röhm & Haas Company, Philadelphia, Pa.

No Drawing. Application May 17, 1941, Serial No. 393,932

8 Claims. (Cl. 260—464)

The present invention relates to an improved method for preparing acrylonitrile from ethylene cyanohydrin.

It has heretofore been known that ethylene cyanohydrin may be converted into acrylonitrile by applying heat to the former while in either liquid or vapor phase in the presence of a dehydrating catalyst, such as acid sulfates, alumina, active carbon, tin and compounds of tin. These previously known processes, however, have not been commercially practical. In the liquid phase conversion, a number of difficulties have been encountered. Particularly troublesome has been the formation of high boiling resinous by-products which, in a short time, dilute and coat the catalyst so that its activity is substantially reduced and recovery thereof is uneconomical. In the vapor phase conversion, where ethylene cyanohydrin is distilled at atmospheric pressure over a catalyst such as zinc chloride on activated carbon heated to 260° C. or over activated alumina at 350° to 400° C., the activity of the catalyst falls off rapidly after a few hours and heavy carbonaceous deposits appear on the catalyst. Some decomposition of the ethylene cyanohydrin also occurs in the distilling chamber, leaving a high boiling residue and coke, even if a flash type vaporizer is used to reduce the time of heating, so that frequent cleaning of the vaporizer is necessary to keep the process in operation.

I have found that when ethylene cyanohydrin is vaporized under reduced pressure, decomposition does not occur. When such vapors are passed over a dehydrating catalyst, such as alumina, thoria, etc., maintained at a temperature of the order of from 300° to 500° C., under reduced pressure, practically no deposit appears on the catalyst. By operating in this manner, the catalyst can be used for long periods of time before it needs to be revivified, and revivification of the catalyst can be readily and easily accomplished. The yields of acrylonitrile are also improved, and, under suitable operating conditions, the yield is substantially 100% of theory. My process may be operated at pressures of 300 mm. of mercury (absolute pressure) or below. At such pressures ethylene cyanohydrin boils at about 180° C. and by operating with a flash type evaporator so that the ethylene cyanohydrin remains in the liquid form for only a short time at this temperature, decomposition is negligible and good results are obtained.

At lower pressures the ethylene cyanohydrin boils at lower temperatures and can be vaporized with less care to prevent decomposition, but then the condensing temperatures of the products, acrylonitrile and water, are lower and better cooling is required to condense the products before the vapors reach the vacuum pump. However, by using a mechanical vacuum pump, the process can be operated at low pressures, and the vapors can then be condensed after leaving the vacuum pump at atmospheric pressure, and then cooling of the products to low temperature is unnecessary.

My invention will be further understood from the following example, which is given by way of illustration:

Ethylene cyanohydrin was vaporized under a reduced pressure of 100 mm. of mercury by dropping it into a coil in an oil bath at 180-200° C. and the vapors were passed over 150 cc. of fresh "activated alumina" held at 350° C. The rate of ethylene cyanohydrin feed was 250-270 g. per hour. The pressure drop through the catalyst zone was 10 mm. of mercury and, after thirty hours, there was no increase in this pressure drop. The catalyst was somewhat darkened after this period of use, but was free from coke. The yield of pure acrylonitrile with the fresh catalyst was 94% of theory and, after thirty hours, the yield was still 92.5% of theory. After a long period of use, the catalyst was restored to its original activity by passing air thereover while heating it to a temperature of 350-400° C.

My process may be conducted within a temperature range of from 300° to 500° C., preferably within a range of from 350° to 450° C., and at reduced pressures of 300 mm. of mercury or below, and, preferably, reduced pressures of from 250 to 50 mm. of mercury. Revivification of the catalyst may be effected in any suitable manner, as, for example, by passage of air or oxygen thereover while heating it to a temperature of from 300° to 500° C. and, preferably, to a temperature of from 350° to 400° C.

I claim:

1. The process of preparing acrylonitrile which comprises passing ethylene cyanohydrin in the vapor phase over a dehydrating catalyst maintained at a temperature within the range of from 300° to 500° C. and under a pressure not exceeding 300 mm. of mercury.

2. The process of preparing acrylonitrile which comprises passing ethylene cyanohydrin in the vapor phase over a dehydrating oxide catalyst maintained at a temperature within the range of from 300° to 500° C. and under a pressure not exceeding 300 mm. of mercury.

3. The process of preparing acrylonitrile which comprises passing ethylene cyanohydrin in the vapor phase over an active aluminum oxide catalyst maintained at a temperature within the range of from 300° to 500° C. and under a pressure not exceeding 300 mm. of mercury.

4. The process of preparing acrylonitrile which comprises passing ethylene cyanohydrin in the vapor phase over a dehydrating catalyst maintained at a temperature within the range of from 350° to 450° C. and under a pressure not exceeding 300 mm. of mercury.

5. The process of preparing acrylonitrile which comprises passing ethylene cyanohydrin in the vapor phase over a dehydrating catalyst maintained at a temperature within the range of from 300° to 500° C. and under a pressure not exceeding 300 mm. of mercury, revivifying the catalyst and reusing it in the process.

6. The process of preparing acrylonitrile which comprises passing ethylene cyanohydrin in the vapor phase over a dehydrating catalyst maintained at a temperature within the range of from 300° to 500° C. and under a pressure not exceeding 300 mm. of mercury, revivifying the catalyst by passing air thereover while maintaining it at a temperature of from 300° to 500° C. and thereafter reusing the catalyst in the process.

7. In the process of preparing acrylonitrile, by thermal decomposition of ethylene cyanohydrin, the improvement which comprises conducting the thermal decomposition at a reduced pressure.

8. In the process of preparing acrylonitrile, by the thermal dehydration of ethylene cyanohydrin in the presence of dehydrating agents, the improvement which comprises conducting the thermal dehydration at a reduced pressure.

LE ROY U. SPENCE.